(12) United States Patent
Papakipos et al.

(10) Patent No.: US 9,299,110 B2
(45) Date of Patent: *Mar. 29, 2016

(54) PERIODIC AMBIENT WAVEFORM ANALYSIS FOR DYNAMIC DEVICE CONFIGURATION

(75) Inventors: Matthew Nicholas Papakipos, Palo Alto, CA (US); David Harry Garcia, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 17 days.

This patent is subject to a terminal disclaimer.

(21) Appl. No.: 13/277,080

(22) Filed: Oct. 19, 2011

(65) Prior Publication Data

US 2013/0103810 A1    Apr. 25, 2013

(51) Int. Cl.
| | | |
|---|---|---|
| *G06F 15/177* | (2006.01) | |
| *G06Q 50/00* | (2012.01) | |
| *G06Q 10/10* | (2012.01) | |
| *G06Q 30/00* | (2012.01) | |

(52) U.S. Cl.
CPC ............... *G06Q 50/01* (2013.01); *G06Q 10/10* (2013.01); *G06Q 30/00* (2013.01)

(58) Field of Classification Search
CPC .................................................. G06Q 50/01
USPC .......................................................... 709/221
See application file for complete search history.

(56) References Cited

U.S. PATENT DOCUMENTS

| | | | | |
|---|---|---|---|---|
| 6,012,027 A * | 1/2000 | Bossemeyer, Jr. | ...... | G10L 15/07 704/243 |
| 6,201,176 B1 * | 3/2001 | Yourlo | ............. | G06F 17/30743 434/307 A |
| 7,174,293 B2 | 2/2007 | Kenyon | | |
| 7,295,970 B1 * | 11/2007 | Gorin | ...................... | G10L 17/12 704/221 |
| 7,392,066 B2 * | 6/2008 | Haparnas | ...................... | 455/567 |
| 7,590,232 B2 * | 9/2009 | Carter | ................ | G07C 9/00158 379/209.01 |
| 8,117,193 B2 * | 2/2012 | Svendsen | .......... | G06F 17/30035 707/722 |
| 8,150,844 B2 * | 4/2012 | Redstone | ............ | G06F 17/3087 455/456.1 |

(Continued)

FOREIGN PATENT DOCUMENTS

| | | |
|---|---|---|
| EP | 1 217 792 | 6/2002 |
| WO | 2009-108725 A2 | 9/2009 |

OTHER PUBLICATIONS

International Search Report and Written Opinion for International Application PCT/US2012/057413, Mar. 4, 2013.

(Continued)

*Primary Examiner* — Kevin Bates
*Assistant Examiner* — Nazia Naoreen
(74) *Attorney, Agent, or Firm* — Baker Botts L.L.P.

(57) ABSTRACT

Client devices periodically capture ambient audio waveforms and modify their own device configuration based on the captured audio waveform. In particular embodiments, client devices generate waveform fingerprints and upload the fingerprints to a server for analysis. The server compares the waveform fingerprints to a database of stored waveform fingerprints, and upon finding a match, pushes content or other information to the client device. The fingerprints in the database may be uploaded by other users, and compared to the received client waveform fingerprint based on common location or other social factors. Thus a client's location may be enhanced if the location of users whose fingerprints match the client's is known, and, based upon this enhanced location, the server may transmit an instruction to the device to modify its device configuration.

20 Claims, 6 Drawing Sheets

(56) References Cited

U.S. PATENT DOCUMENTS

| | | | | |
|---|---|---|---|---|
| 8,175,617 B2* | 5/2012 | Rodriguez | | 455/456.1 |
| 8,255,393 B1* | 8/2012 | Yu | | H04L 63/1441 |
| | | | | 707/724 |
| 8,315,800 B2* | 11/2012 | Sanchez | | G01C 11/34 |
| | | | | 701/438 |
| 8,321,394 B2 | 11/2012 | Wessling | | |
| 8,326,624 B2* | 12/2012 | Jaiswal | | G10L 15/26 |
| | | | | 348/468 |
| 8,457,964 B2* | 6/2013 | Jaiswal | | G10L 15/26 |
| | | | | 704/235 |
| 8,527,279 B2* | 9/2013 | Singleton | | G10L 15/08 |
| | | | | 704/255 |
| 8,538,753 B2* | 9/2013 | Krishnaswamy | | G10L 17/00 |
| | | | | 704/235 |
| 8,542,803 B2* | 9/2013 | Abella | | H04M 3/5307 |
| | | | | 379/88.13 |
| 2005/0282590 A1 | 12/2005 | Haparnas | | |
| 2006/0234758 A1* | 10/2006 | Parupudi et al. | | 455/550.1 |
| 2007/0192067 A1* | 8/2007 | Wong et al. | | 702/189 |
| 2009/0186633 A1 | 7/2009 | Yonker | | |
| 2010/0001743 A1 | 1/2010 | Hemmady | | |
| 2010/0142715 A1* | 6/2010 | Goldstein | | H04R 1/1083 |
| | | | | 381/56 |
| 2011/0098029 A1 | 4/2011 | Rodriguez | | |
| 2011/0113037 A1 | 5/2011 | Wessling | | |
| 2013/0046823 A1* | 2/2013 | Mitchell et al. | | 709/204 |

OTHER PUBLICATIONS

Extended European Search Report for EP 12842481.9-1955/ 2769562, May 11, 2015.

Result of the examination on the merits of the invention (Office Action), Mexican Institute of Industrial Property, Patent Application No. MX/a/2014/004804 (with English Translation), Jul. 17, 2015.

* cited by examiner

PERIODIC AMBIENT WAVEFORM ANALYSIS FOR DYNAMIC DEVICE CONFIGURATION

TECHNICAL FIELD

This disclosure generally relates to periodically capturing waveform data using the sensor subsystem of a mobile device and generating a fingerprint of the waveform for dynamic device configuration.

BACKGROUND

A social networking system, such as a social networking website, enables its users to interact with it and with each other through the system. The social networking system may create and store a record, often referred to as a user profile, in connection with the user. The user profile may include a user's demographic information, communication channel information, and personal interest. The social networking system may also create and store a record of a user's relationship with other users in the social networking system (e.g., social graph), as well as provide services (e.g., wall-posts, photo-sharing, or instant messaging) to facilitate social interaction between users in the social networking system. A geo-social networking system is a social networking system in which geographic services and capabilities are used to enable additional social interactions. User-submitted location data or geo-location techniques (e.g., mobile phone position tracking) can allow a geo-social network to connect and coordinate users with local people or events that match their interests. For example, users can check-in to a place using a mobile client application by providing a name of a place (or selecting a place from a pre-established list of places). The geo-social networking system, among other things, can record information about the user's presence at the place and possibly provide this information to other users of the geo-social networking system.

SUMMARY

Particular embodiments relate to a geo-social networking system that includes features directed to automatically adjusting mobile device settings based upon ambient audio conditions. This disclosure also relates to adjusting mobile device settings based on social data calculated from periodic uploads of waveform data from a plurality of users of the geo-social networking system. These and other features, aspects, and advantages of the disclosure are described in more detail below in the detailed description and in conjunction with the following figures.

DESCRIPTION OF EXAMPLE EMBODIMENTS

Figure 1:
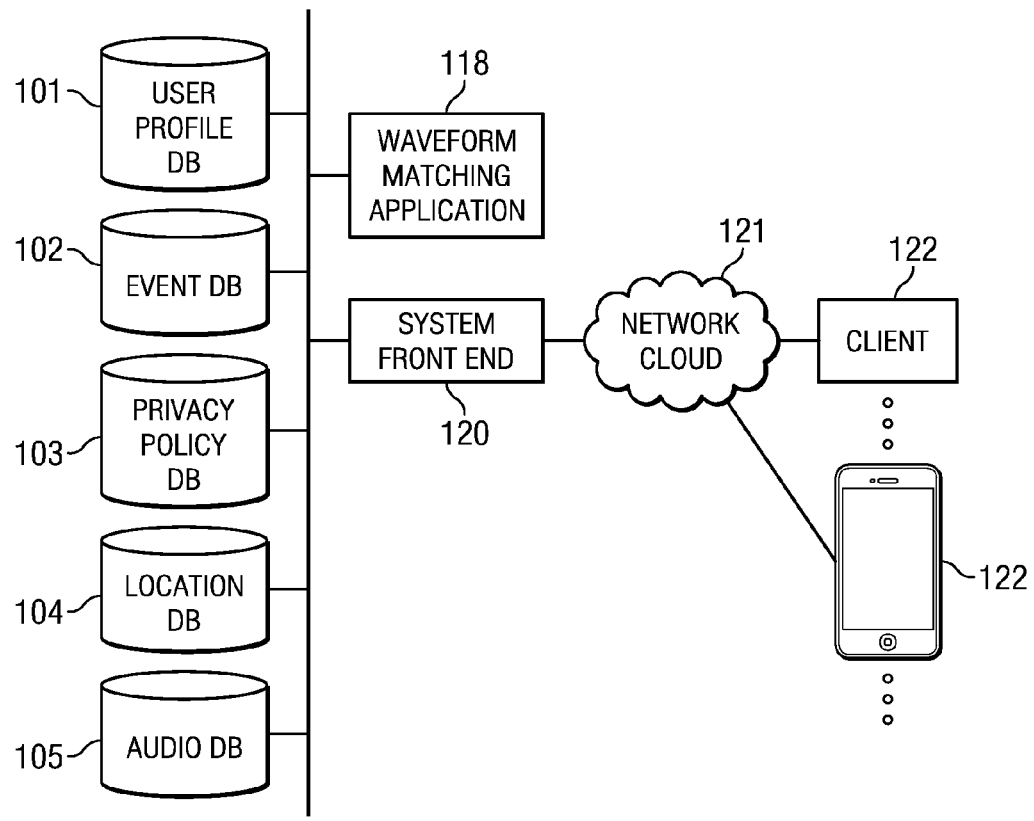
FIG. 1 illustrates an example social networking environment.

The invention is now described in detail with reference to a few embodiments thereof as illustrated in the accompanying drawings. In the following description, numerous specific details are set forth in order to provide a thorough understanding of the present disclosure. It is apparent, however, to one skilled in the art, that the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

A social networking system, such as a social networking website, enables its users to interact with it, and with each other through, the system. Typically, to become a registered user of a social networking system, an entity, either human or non-human, registers for an account with the social networking system. Thereafter, the registered user may log into the social networking system via an account by providing, for example, a correct login ID or username and password. As used herein, a "user" may be an individual (human user), an entity (e.g., an enterprise, business, or third party application), or a group (e.g., of individuals or entities) that interacts or communicates with or over such a social network environment.

When a user registers for an account with a social networking system, the social networking system may create and store a record, often referred to as a "user profile", in connection with the user. The user profile may include information provided by the user and information gathered by various systems, including the social networking system, relating to activities or actions of the user. For example, the user may provide his name, profile picture, contact information, birth date, gender, marital status, family status, employment, education background, preferences, interests, and other demographical information to be included in his user profile. The user may identify other users of the social networking system that the user considers to be his friends. A list of the user's friends or first degree contacts may be included in the user's profile. Connections in social networking systems may be in both directions or may be in just one direction. For example, if Bob and Joe are both users and connect with each another, Bob and Joe are each connections of the other. If, on the other hand, Bob wishes to connect to Sam to view Sam's posted content items, but Sam does not choose to connect to Bob, a one-way connection may be formed where Sam is Bob's connection, but Bob is not Sam's connection. Some embodiments of a social networking system allow the connection to be indirect via one or more levels of connections (e.g., friends of friends). Connections may be added explicitly by a user, for example, the user selecting a particular other user to be a friend, or automatically created by the social networking system based on common characteristics of the users (e.g., users who are alumni of the same educational institution).

The user may identify or bookmark websites or web pages he visits frequently and these websites or web pages may be included in the user's profile.

The user may provide information relating to various aspects of the user (such as contact information and interests) at the time the user registers for an account or at a later time. The user may also update his or her profile information at any time. For example, when the user moves, or changes a phone number, he may update his contact information. Additionally, the user's interests may change as time passes, and the user may update his interests in his profile from time to time. A user's activities on the social networking system, such as frequency of accessing particular information on the system, may also provide information that may be included in the user's profile. Again, such information may be updated from time to time to reflect the user's most-recent activities. Still further, other users or so-called friends or contacts of the user may also perform activities that affect or cause updates to a user's profile. For example, a contact may add the user as a friend (or remove the user as a friend). A contact may also write messages to the user's profile pages—typically known as wall-posts. A user may also input status messages that get posted to the user's profile page.

A social network system may maintain social graph information, which can generally model the relationships among groups of individuals, and may include relationships ranging from casual acquaintances to close familial bonds. A social network may be represented using a graph structure. Each node of the graph corresponds to a member of the social network. Edges connecting two nodes represent a relationship between two users. In addition, the degree of separation between any two nodes is defined as the minimum number of hops required to traverse the graph from one node to the other. A degree of separation between two users can be considered a measure of relatedness between the two users represented by the nodes in the graph.

A social networking system may support a variety of applications, such as photo sharing, on-line calendars and events. For example, the social networking system may also include media sharing capabilities. For example, the social networking system may allow users to post photographs and other multimedia files to a user's profile, such as in a wall post or in a photo album, both of which may be accessible to other users of the social networking system. Social networking system may also allow users to configure events. For example, a first user may configure an event with attributes including time and date of the event, location of the event and other users invited to the event. The invited users may receive invitations to the event and respond (such as by accepting the invitation or declining it). Furthermore, social networking system may allow users to maintain a personal calendar. Similarly to events, the calendar entries may include times, dates, locations and identities of other users.

The social networking system may also support a privacy model. A user may or may not wish to share his information with other users or third-party applications, or a user may wish to share his information only with specific users or third-party applications. A user may control whether his information is shared with other users or third-party applications through privacy settings associated with his user profile. For example, a user may select a privacy setting for each user datum associated with the user and/or select settings that apply globally or to categories or types of user profile information. A privacy setting defines, or identifies, the set of entities (e.g., other users, connections of the user, friends of friends, or third party application) that may have access to the user datum. The privacy setting may be specified on various levels of granularity, such as by specifying particular entities in the social network (e.g., other users), predefined groups of the user's connections, a particular type of connections, all of the user's connections, all first-degree connections of the user's connections, the entire social network, or even the entire Internet (e.g., to make the posted content item indexable and searchable on the Internet). A user may choose a default privacy setting for all user data that is to be posted. Additionally, a user may specifically exclude certain entities from viewing a user datum or a particular type of user data.

Social networking system may maintain a database of information relating to geographic locations or places. Places may correspond to various physical locations, such as restaurants, bars, train stations, airports and the like. Some places may correspond to larger regions that themselves contain places—such as a restaurant or a gate location in an airport. In one implementation, each place can be maintained as a hub node in a social graph or other data structure maintained by the social networking system, as described in U.S. patent application Ser. No. 12/863,181, which is incorporated by reference herein for all purposes. Social networking system may allow users to access information regarding each place using a client application (e.g., a browser) hosted by a wired or wireless station, such as a laptop, desktop or mobile device. For example, social networking system may serve web pages (or other structured documents) to users that request information about a place. In addition to user profile and place information, the social networking system may track or maintain other information about the user. For example, the social networking system may support geo-social networking system functionality including one or more location-based services that record the user's location. For example, users may access the geo-social networking system using a special-purpose client application hosted by a mobile device of the user (or a web- or network-based application using a browser client). The client application may automatically access Global Positioning System (GPS) or other geo-location functions supported by the mobile device and report the user's current location to the geo-social networking system. In addition, the client application may support geo-social networking functionality that allows users to check-in at various locations and communicate this location to other users. A check-in to a given place may occur when a user is physically located at a place and, using a mobile device, access the geo-social networking system to register the user's presence at the place. A user may select a place from a list of existing places near to the user's current location or create a new place. The user may also provide comments in a text string when checking in to a given place. The user may also identify one or more other users in connection with a check-in (such as friends of a user) and associate them with the check-in as well. U.S. patent application Ser. No. 12/584,614, which is incorporated by reference herein for all purposes, describes a system that allows a first user to check-in other users at a given place. An entry including a comment and a time stamp corresponding to the time the user checked in may be displayed to other users. For example, a record of the user's check-in activity may be stored in a database. Social networking system may select one or more records associated with check-in activities of users at a given place and include such check-in activity in web pages (or other structured documents) that correspond to a given place. For example, social networking system may select the check-in activity associated with the friends or other social contacts of a user that requests a page corresponding to a place. U.S. application Ser. No. 12/858,817, incorporated by reference in its entirety for all purposes, describes an example geo-social networking system that can be used in connection with various embodiments of the present invention. The check-in activity may also be displayed on a user profile page and in news feeds provided to users of the social networking system.

Still further, a special purpose client application hosted on a mobile device of a user may be configured to continuously capture location data of the mobile device and send the location data to social networking system. In this manner, the social networking system may track the user's location and provide various recommendations to the user related to places that are proximal to the user's path or that are frequented by the user. In one implementation, a user may opt in to this recommendation service, which causes the client application to periodically post location data of the user to the social networking system.

Particular embodiments of the special purpose client application hosted on a mobile device of a user may be configured to continuously or periodically capture ambient audio waveform data using a microphone or sensor subsystem in the mobile device. In particular embodiments, the mobile device may perform waveform analysis on the ambient audio, and adjust the device settings, such as the ringer volume or vibrate mode, based upon the ambient waveform data. In particular embodiments, the client device may automatically match the ringer volume to match or slightly exceed the ambient audio level, thereby increasing the probability that the ringer is audible in noisy environments and appropriate in quiet environments. In particular embodiments, the self-determined location of the mobile device may be utilized to adjust the device settings. For example, if a user's GPS indicates he is in a movie theatre, the device may automatically turn off its ringer.

In particular embodiments, the mobile device may generate a waveform fingerprint of the captured ambient waveform for compact, bandwidth-efficient transmission to the social networking system. In particular embodiments, received waveform fingerprints may be matched to a database of object waveforms. For example, if a user is in a particular location and the waveform fingerprint uploaded by his or her mobile device matches the fingerprint of a particular song stored in an audio database, the social networking system may determine that the user is currently listening to the song.

In particular embodiments, a combination of database information, waveform matching, and the user's GPS data may be utilized to adjust the user's device settings. For example, GPS devices often do not function indoors. Thus, a user's last reported location may be in the vicinity of, but not in, a movie theatre. If the reported location of a user device is near a movie theatre, and the user's waveform fingerprint matches the soundtrack of a particular movie, the social networking system may access an online database of the show times for the theatre in the user's vicinity. Based off the timestamp from the uploaded waveform fingerprint, the matched movie, and the GPS location, the social network may determine that the user is watching, for example, the 5:30 PM showing of "True Grit" at AMC 30. Thus the device may automatically turn off its ringer.

Still further, particular embodiments allow the social networking system to receive waveform fingerprints from a client or mobile device, and perform analysis on the waveform fingerprints to provide enhanced social functions to the user of the device. In particular embodiments, the determined location of the client device may be enhanced through waveform analysis. For example, if a user is in a particular venue, the waveform fingerprints captured by his mobile device will match the waveform fingerprints uploaded by other users. If any of the other users' locations converge, or if one of the users makes an explicit on-network statement that he or she is at the venue, either through a check-in operation, registering for an event, or a comment, the social networking system may update and enhance the user's inaccurately determined position. In particular embodiments, the mobile device may adjust its settings based on the received location from the social networking system.

In particular embodiments, information from the social network may be leveraged to adjust device settings. In particular embodiments, information from the user's profile and actions on the social network may be utilized to adjust the user's device settings. For example, if a user checks-in to a public library, the device may automatically turn off its ringer. Alternatively, if the user checks in or is tagged at a sporting event, the device may increase its ringer volume. Additionally, information can be leveraged from other users of the social networking system. For example, if multiple users are determined, through waveform analysis, to be in the same location, and one of the users gives a signal as to the type of the event, either by way of commenting, checking-in, updating his or her status, tagging, etc, then all the users determined to be in that location may have their device settings automatically changed.

FIG. 1 illustrates an example social networking system. In particular embodiments, the social networking system may store user profile data and social graph information in user profile database 101. In particular embodiments, the social networking system may store user event data in event database 102. For example, a user may register a new event by accessing a client application to define an event name, a time and a location, and cause the newly created event to be stored in event database 102. In particular embodiments, the social networking system may store user privacy policy data in privacy policy database 103. In particular embodiments, the social networking system may store geographic and location data in location database 104. In particular embodiments, social networking system may store audio waveforms or audio waveform fingerprints for various songs, tv shows, soundtracks, movies, performances, and the like in audio database 105. In particular embodiments, databases 101, 102, 103, 104, and 105 may be operably connected to the social networking system's front end. In particular embodiments, social networking system also includes waveform matching application 118, that matches uploaded waveform fingerprints with waveforms or waveform fingerprints stored in audio database 105.

In particular embodiments, the front end 120 may interact with client device 122 through network cloud 121. Client device 122 is generally a computer or computing device including functionality for communicating (e.g., remotely) over a computer network. Client device 122 may be a desktop computer, laptop computer, personal digital assistant (PDA), in- or out-of-car navigation system, smart phone or other cellular or mobile phone, or mobile gaming device, among other suitable computing devices. Client device 122 may execute one or more client applications, such as a web browser (e.g., Microsoft Windows Internet Explorer, Mozilla Firefox, Apple Safari, Google Chrome, and Opera, etc.) or special-purpose client application (e.g., Facebook for iPhone, etc.), to access and view content over a computer network. Front end 120 may include web or HTTP server functionality, as well as other functionality, to allow users to access the social networking system. Network cloud 121 generally represents a network or collection of networks (such as the Internet or a corporate intranet, or a combination of both) over which client devices 122 may access the social network system.

In particular embodiments, location database 104 may store an information base of places, where each place includes a name, a geographic location and meta information (such as the user that initially created the place, reviews, comments, check-in activity data, and the like). Places may be created by administrators of the system and/or created by users of the system. For example, a user may register a new place by accessing a client application to define a place name and provide a geographic location and cause the newly created place to be registered in location database 104. As discussed above, a created place may correspond to a hub node, which an administrator can claim for purposes of augmenting the information about the place and for creating ads or other offers to be delivered to users. In particular embodiments, system front end 120 may construct and serve a web page of a place, as requested by a user. In some embodiments, a web page of a place may include selectable components for a user to "like" the place or check in to the place. In particular embodiments, location database 104 may store geo-location data identifying a real-world geographic location of a user associated with a check-in. For example, a geographic location of an Internet connected computer can be identified by the computer's IP address. For example, a geographic location of a cell phone equipped with cellular, Wi-Fi and/or GPS capabilities can be identified by cell tower triangulation, Wi-Fi positioning, and/or GPS positioning. In particular embodiments, location database 104 may store a geographic location and additional information of a plurality of places. For example, a place can be a local business, a point of interest (e.g., Union Square in San Francisco, Calif.), a college, a city, or a national park. For example, a geographic location of a place (e.g., a local coffee shop) can be an address, a set of geographic coordinates (latitude and longitude), or a reference to another place (e.g., "the coffee shop next to the train station"). For example, a geographic location of a place with a large area (e.g., Yosemite National Park) can be a shape (e.g., a circle, or a polygon) approximating the boundary of the place and/or a centroid of the shape. For example, additional information of a place can be business hours, photos, or user reviews of the place. In particular embodiments, location database 104 may store a user's location data. For example, a user can create a place (e.g., a new restaurant or coffee shop) and the social networking system can store the created place in location database 104. For example, location database 104 may store a user's check-in activities. For example, location database 104 may store a user's geographic location provided by the user's GPS-equipped mobile device. In particular embodiments, the social networking system may calculate one or more routes of a user based on the user's user profile information, check-in activities, and/or geographic location data reported by a client application (see above) and store the one or more routes in location database 104. For example, the social networking system can calculate a "commute route" of a user between the user's home and work (as described in the user's user profile information stored in user profile database 101) by using a mapping service application such as Google Map, or by using geographic location data points from the user's GPS-equipped mobile phone while the user is driving to work.

Waveform matching application 118 matches waveforms or waveform fingerprints uploaded by client devices 122 to waveforms or waveform fingerprints in audio database 105. In particular embodiments, waveform matching application utilizes feature detection using Fast Fourier Transforms (FFTs) or Direct Cosine Transforms (DCTs). In particular embodiments, cross correlation in either the frequency or time domain is utilized for waveform matching. In particular embodiments, dynamic waveform matching (DWM) may be utilized to shift the waveforms on the time axis. In particular embodiments, waveform matching application 118 utilizes audio fingerprinting of the waveform files in audio database 105. This disclosure contemplates any suitable method or algorithm for waveform or waveform fingerprint matching.

Figure 2:
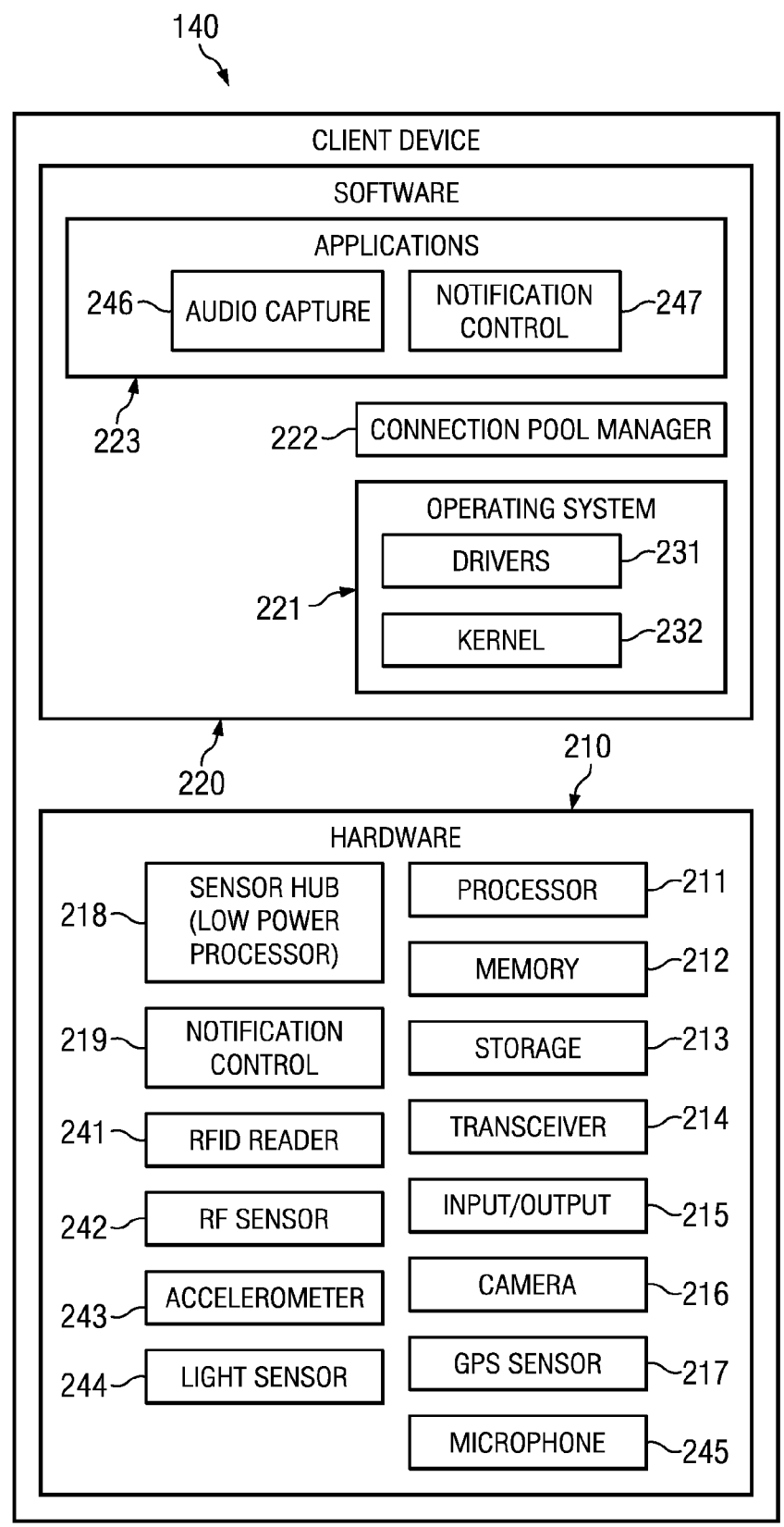
FIG. 2 illustrates an example user device.

FIG. 2 illustrates an example client device 122. In particular embodiments, client device 122 may be a smart phone (e.g., iPhone or Blackberry), which is a mobile telephone that offers more advanced computing ability and connectivity than a traditional mobile phone. It may be considered as a handheld computer integrated with a mobile phone. In particular embodiments, client device 122 may be a netbook or tablet computer (e.g., iPad). In particular embodiments, client device 122 may be connected to a network through a wireless connection.

In particular embodiments, client device 122 may include hardware 210 and software 220. In particular embodiments, hardware 210 may include any number of hardware components such as, for example and without limitation, processor 211, memory 212, storage 213, transceiver 214, input/output device 215 (e.g., display, touch screen, keypad, microphone, speaker, etc.), camera 216, global positioning system (GPS) sensor 217, sensors hub 218, notification control switch 219, RFID reader 241, RF sensor 242, accelerometer 243, light sensor 244, microphone 245 (which may be part of input/output block 215) and so on. This disclosure contemplates any suitable hardware components. In particular embodiments, some or all of a user's user data may be stored in storage 213.

In particular embodiments, software 220 may include an operating system 221, which may include a kernel 231 and/or any number of device drivers 232 corresponding to some of the hardware components available on client device 122. Operating system 221 may be selected for client device 122 based on the actual type of device client device 122 is. For example, if client device 122 is a mobile device (e.g., a smart phone), then operating system 221 may be a mobile operating system such as, for example and without limitation, Microsoft's Windows Mobile, Google's Android, Nokia's Symbian, Apple's iOS, and Samsung's Bada.

In particular embodiments, one or more software applications 223 may be hosted and/or executed on client device 122. In particular embodiments, they may be native applications installed and residing on client device 122. For example, one application (e.g., Google Maps) may enable a device user to view a map, search for addresses and businesses, and get directions; a second application may enable the device user to read, send, and receive emails; a third application (e.g., a web browser) may enable the device user to browse and search the Internet; a fourth application may enable the device user to take photos or record videos using camera 216; a fifth application may allow the device user to receive and initiate VoIP and/or cellular network calls, and so on. In particular embodiments, there may be a software application (e.g., notification control 241) that enables the device user to manage the notifications pushed to client device 122. Each software application 220 may have a user interface and may implement one or more specific functionalities. Each software application 220 may include one or more software modules implementing the individual functionalities. The executable code of software applications 220, including notification control 241, may be stored in a computer-readable and non-transitory medium (e.g., storage 213 or memory 212) on client device 122.

Audio capture application 246 is operably connected to microphone 245 and sensor hub 218. In particular embodiments, audio capture application 246 continuously captures audio data and converts it into a waveform fingerprint, using audio feature detection algorithms (FFT/DCT/etc.). In particular embodiments, audio capture application 246 only periodically captures waveform data and converts the data into waveform fingerprints. In particular embodiments, sensor hub 218 captures and stores waveform data via microphone 245 and stores the waveforms in storage 213 for later fingerprint generation by audio capture application 245. In particular embodiments, audio capture application 246 runs only when the user changes location. In particular embodiments, audio capture application 246 runs only when the detected sound level exceeds a predetermined number of decibels. This disclosure contemplates any suitable manner of capturing ambient audio data.

Figure 3:
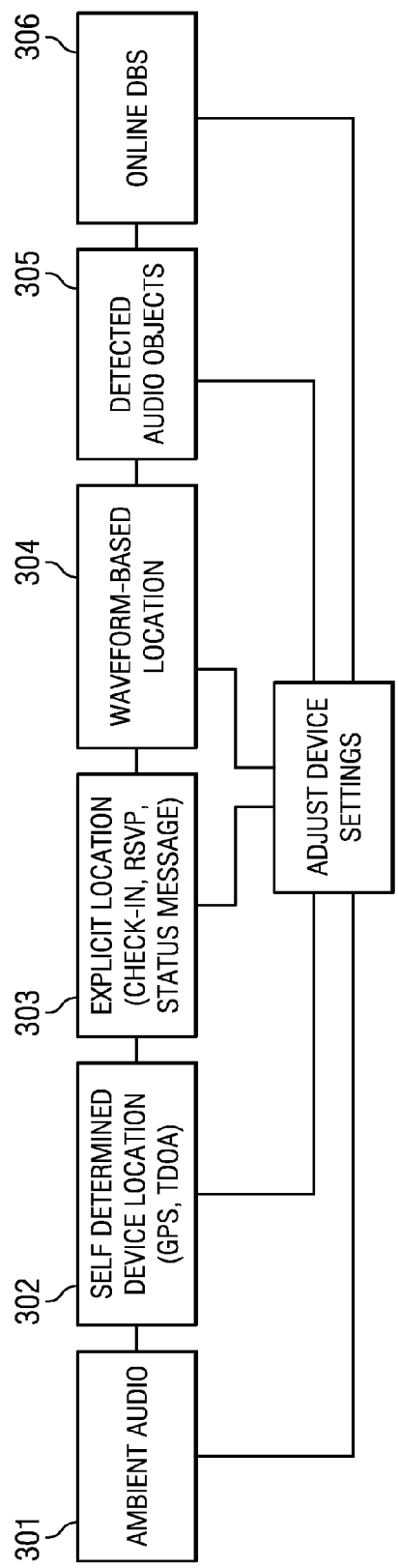
FIG. 3 illustrates the example data sources the social networking system may utilize to determine whether to and to what setting to adjust the settings of a mobile device.

FIG. 3 illustrates the example data sources that may be utilized by client device 122 or the social networking system to determine whether to adjust client device 122's settings as well as how to adjust the settings. Data sources 301-306 may be utilized by client device 122 alone, or in any combination with each other, to adjust the device settings of client device 122. Ambient audio 301 and self-determined device location 302 may be utilized by client device 122 without any interaction with the social networking system. For example, a basic method of adjusting client device 122's settings is based solely upon ambient audio 301. In particular embodiments, client device 122 captures the ambient audio waveform and calculates the average ambient noise level of the environment (for example, 95 database). In particular embodiments, client device 122 adjusts its ringer volume to match or be slightly louder than the ambient noise level. In particular embodiments, where the ambient noise is above or below a predetermined threshold, client device 122 may turn on vibrate mode.

In particular embodiments, self-determined device location 302 and online database 306 are utilized in conjunction to adjust the device settings. For example, if client device 122 reports a longitude/latitude position that is associated with a particular venue, client device 122 may adjust its settings based on the type of venue. For example, if the self-determined location of client device 122 is associated with a movie theatre, client device 122 may turn off its ringer, or enable vibrate mode. In particular embodiments, online database 306 may be a one or more servers in the social networking system. In particular embodiments, online database 306 may be an external, third-party database such as Google Maps, Yelp, or FourSquare. In particular embodiments, client device 122 accesses online databases 306 without action from the social networking system. In particular embodiments, client device 122 accesses online databases 306 via the social networking system. This disclosure contemplates any suitable manner of accessing, and any type of, online databases 306.

In particular embodiments, explicit location 303 may be utilized in adjusting the device settings of client device 122. Explicit locations may be self-declared, such as a check-in, comment, RSVP, tag, etc. by the user of client device 122, or may be declared by other users who check the user in, tag him or her in photos, or the like. For example, the social networking system may determine, from user actions on the social network, that client device 122 is in a particular location or at a particular event, and adjust device settings based on this determination. For example, a user may check-in to an event on the social network, such as a wedding or a nightclub. Accordingly, the social networking system may issue a command to client device 122 to respectively decrease or increase the ringer volume. This disclosure contemplates any manner of utilizing on-network actions to adjust device settings.

In particular embodiments, waveform-based location 304 may be utilized to adjust device settings. For example, if the audio waveform fingerprints uploaded by client device 122 match the audio waveform fingerprints uploaded by other users, the social networking system may correct client device 122's location, and adjust the device settings based on this corrected location. In particular embodiments, explicit location information 303 of other detected users may be utilized to adjust the device settings. This particular embodiment is further described with reference to FIGS. 4, 4A, and 5.

In particular embodiments, various combinations of data sources 301-306 may be utilized to adjust the settings of client device 122. For example, ambient audio 301 may be utilized to match objects in audio object database 105 to generate a detected audio object 305. This detected audio object may be utilized in conjunction with self-determined location 302, explicit location 303, or waveform-based location 304 to further refine the location of client device 122. Alternatively or additionally, online database 306 may be utilized to further refine the location of client device 122 and subsequently adjust the device settings of client device 122. For example, a user whose client device's self-determined location 302 indicates he is in the vicinity of a park may capture and upload an audio waveform fingerprint matching a song by a band playing at the park. Client device 122 or, alternatively, the social networking system, may access an online database 306 which includes a list of performances near the park. If it finds a match between the detected audio object 305 and one of the performances in online database 306, the social networking system knows that the user is actually at the park and listening to a live performance, and may adjust its ringer to "high" and turn on the vibrate mode. This disclosure contemplates any suitable combination of data sources 301-306 for adjusting the settings of client device 122.

Figure 4:
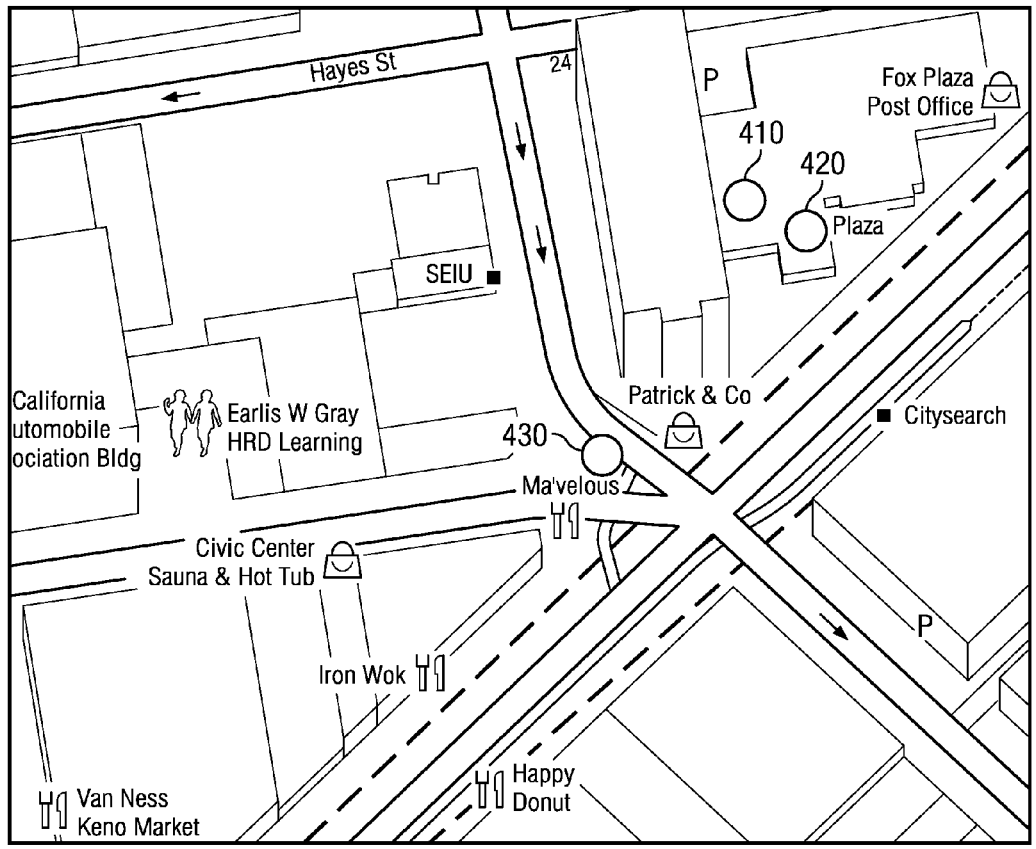
FIG. 4 illustrates an example of three users of the social networking system whose self-reported geographic locations are in the same vicinity.

FIG. 4 illustrates an example geographic area 400 and the self-reported location of various users 410, 420, and 430 of the social networking system on the map. In particular embodiments, the self-reported location is calculated by a GPS receiver chip in client devices 122. In particular embodiments, the location is calculated by TDOA or other position determination algorithms. In particular embodiments, geographic area may be segmented into various quadrants, and user waveform fingerprints may be searched against waveform fingerprints uploaded by other users in the same quadrant. In particular embodiments, the search area is based on the amplitude or absolute volume of the uploaded fingerprint. For example, if an uploaded fingerprint indicates that the ambient sound in the environment of the user is extremely loud, the search area may be decreased, as there would be a larger number of users reporting the same sound from disparate locations. In particular embodiments, the social networking system first searches the fingerprints uploaded by friends of the user at the same time, based on the assumption that they are more likely to be together. In particular embodiments, spatial partitioning algorithms may be used to determine the search space. In particular embodiments, an oct-tree spatial partitioning algorithm is utilized to address the search space. In particular embodiments, a kd-tree is used. in particular embodiments, a quad-tree, or any other grid-based method, is used. This disclosure contemplates any suitable method of generating a search area for fingerprints uploaded by other users.

In FIG. 4, three users' self-determined locations are plotted on the map. Two users, 410 and 420, report their location to be within a few meters of each other, in the Fox Plaza. Another user, 430, reports his or her location to be across the street, near the "Ma'velous" restaurant. Users 410, 420, and 430 may or may not have explicit edge connections between each other on the social graph. For the purposes of this example, the social networking system has matched the waveform fingerprints generated by all three users.

Figure 4A:
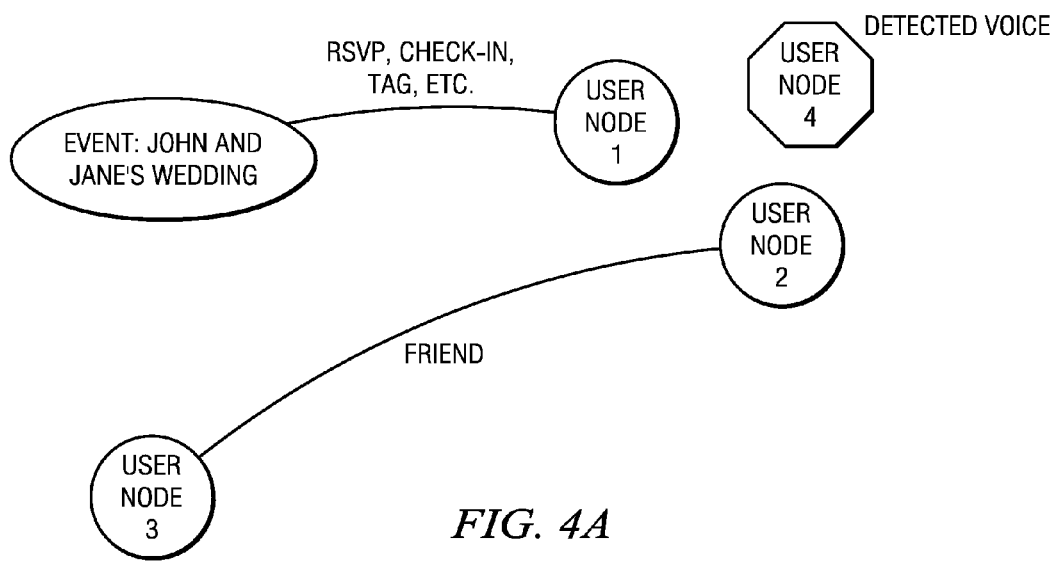
FIG. 4A illustrates an example portion of a social graph representing the three users of FIG. 3

FIG. 4A illustrates an example portion of a social graph including user 410, represented by user node 1, user 420, represented by user node 2, and user 430, represented by user node 3. Because the waveform fingerprints from all three users match, the social networking system may assume that they are in the same general vicinity. In particular embodiments, the social networking system takes into account the amplitude of all three waveform fingerprints. For example, if all three waveform fingerprints are at the same volume, and the volume is low, the social network may infer that the user location of user 430 is incorrect, and may transmit a corrected location to client device 122 of user 430. On the other hand, if all three waveform fingerprints are at the same volume, and the volume is very high, then the social network may not transmit a corrected location.

In FIG. 4A, user node 1 has performed an explicit, on-network action, such as RSVPing to an event, checking-in to a location, or being tagged in a location or event, for an event page, in this case "John and Jane's Wedding." Thus, the social network immediately knows, upon finding matching waveform fingerprints to the fingerprints transmitted by user node 1, that the users transmitting the matching fingerprints are also in the same location and attending the same event. Thus, user nodes 2 and 3 may be placed at the same location, and a corrected location may be transmitted to user node 3 (user 430 of FIG. 4). In particular embodiments, the type of event can be used to determine whether to alter the device settings of the users. For example, given that the social network knows that user nodes 1, 2, and 3 are attending a wedding, it may transmit a command to automatically change the client device settings to "silent" or "vibrate."

Figure 5:
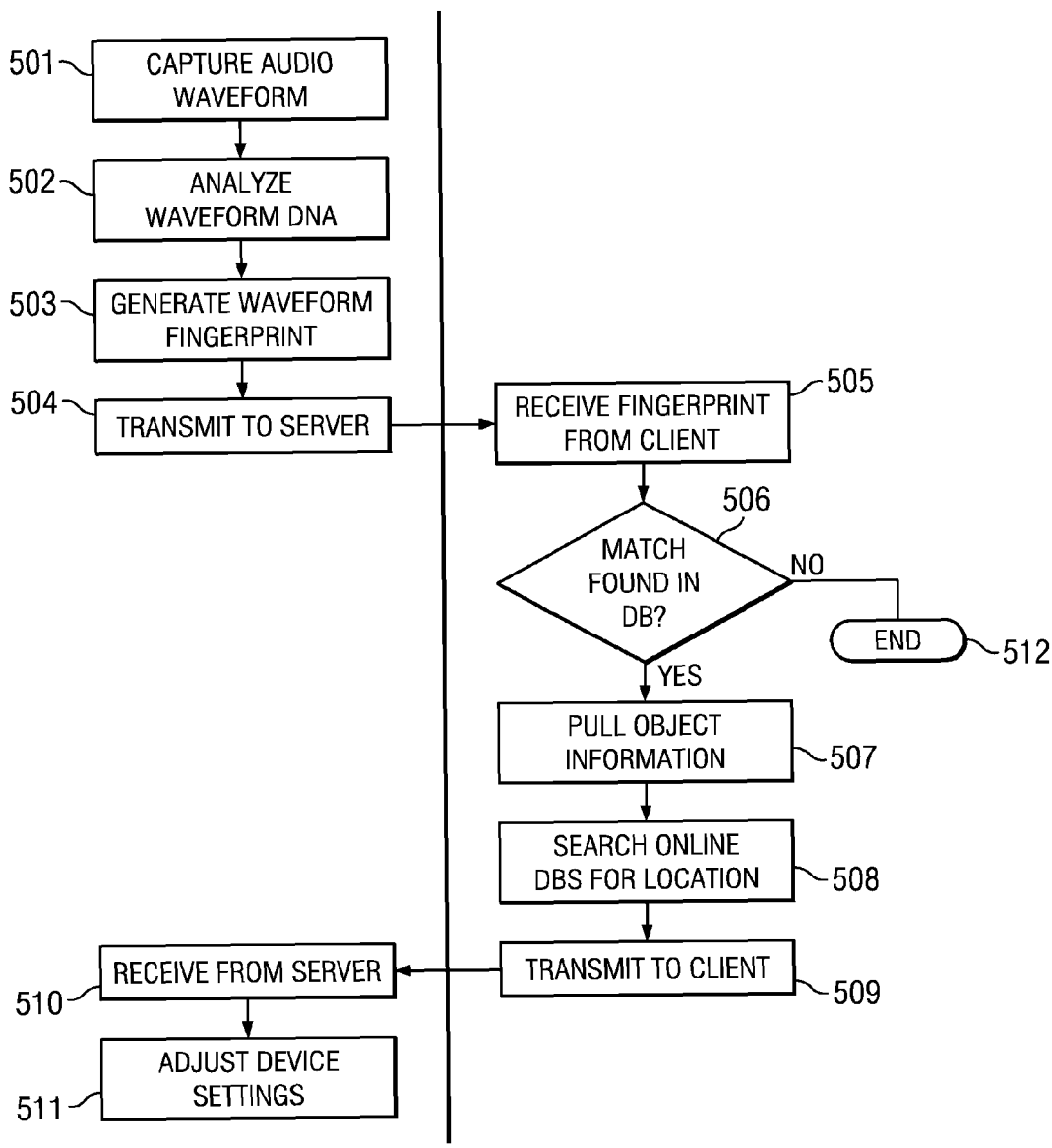
FIG. 5 illustrates an example method of adjusting device settings based on captured ambient audio searched against online databases.

FIG. 5 illustrates an example method for adjusting device settings based on ambient waveform capture. At step 501, microphone 245 of client device 122 records an audio waveform. As previously discussed, waveform recording may be carried out by processor 211 running audio capture application 246, or low-power processor in sensor hub 218. In particular embodiments, client device 122 constantly records the ambient audio and stores it in storage 213. In particular embodiments, client device 122 periodically records ambient audio for analysis. In particular embodiments, client device 122 records the ambient audio whenever a change in position is detected via GPS sensor 217 or other location determination algorithms. In particular embodiments, client device 122 captures the ambient audio whenever the audio exceeds a certain volume. In particular embodiments, audio capture step 501 is triggered by user interaction with the social network, such as using a social networking application, viewing the social networking website, or checking-in to a location. This disclosure contemplates any suitable manner of initiating or timing audio capture.

At Step 502, audio capture application 246 performs feature detection on the waveform and analyzes waveform characteristics, also referred to as the "waveform DNA." Feature detection step 502 may include, in particular embodiments, identifying spikes in the audio waveform, predominance or lack of a particular frequency band, or other trends in waveform amplitude. In particular embodiments, the feature detection is implemented via an FFT or DCT. In particular embodiments, other frequency-domain transforms may be utilized to identify key characteristics of the waveform, such as how much treble or bass is present in the waveform. In particular embodiments, audio capture application 246 utilizes a discrete wavelet transform. In particular embodiments, audio capture application 246 utilizes a short-time fourier transform. In particular embodiments, audio capture application 246 detects a fundamental frequency of the waveform. In particular embodiments, audio capture application 246 filters noise components from the captured waveform. In particular embodiments, audio capture application 246 utilizes a form of event onset detection to create a beat model for the captured waveform. In particular embodiments, audio capture application 246 generates a beat histogram for the waveform. This disclosure contemplates any suitable method or algorithm for audio waveform feature detection.

At Step 503, an audio "fingerprint" is generated for one or more waveforms. The fingerprint is a small robust representation that summarizes the waveform or collection of waveforms. For example, in particular embodiments, waveforms may be captured and analyzed periodically, at one sample per second. Each waveform captured may be analyzed for feature detection, and audio capture application 246 may aggregate a number of waveforms having similar features (perhaps 100-200 waveforms) and generate a fingerprint for the aggregate waveform representing a song, video, or soundtrack to a movie. In particular embodiments, audio capture application 246 uses vector quantization to generate representative vectors as the waveform fingerprint. In particular embodiments, audio capture application 246 utilizes spectrogram peaks, such as those used in the Shazam song recognition software, as the captured waveform fingerprint. Techniques for generating waveform fingerprints are well-known in the art. This disclosure contemplates any suitable manner of generating fingerprints for the captured waveform or waveforms.

At Step 504, client device 122 transmits the fingerprint generated in Step 503 to a server. In particular embodiments, the server is the system front end 120 of the social networking system. In particular embodiments, client device 122 transmits the fingerprint directly to one or more servers running audio matching application 118. This disclosure contemplates any suitable mechanism of transmitting the waveform fingerprints to audio matching application 118. The one or more servers running audio matching application 118 receive the transmitted fingerprint at Step 505.

At Step 506, the received fingerprint is searched against a database of fingerprints stored in audio database 105. In particular embodiments, audio database 105 stores fingerprints of various different formats, so that fingerprints generated by a different method may still be compared to the stored fingerprints. In particular embodiments, audio database 105 stores waveforms, and the fingerprints for the stored waveforms are dynamically generated. If no matches are found, the process ends at Step 512.

If a match is found, at Step 507, information relating to the object associated with the matching fingerprint is pulled from the social networking system. In particular embodiments, this information is stored in audio database 105. In particular embodiments, the information may be stored in a separate object or node database in the social networking system. In particular embodiments, the information may be metadata attached to the waveform stored in audio database 105. The information may comprise general characteristics, such as the artist, song title, album title, date of recording, etc., and social characteristics, such as how many of the user's friends have "liked", commented on, or otherwise interacted with the object. In particular embodiments, the information may be other songs performed by the artist, or other types of music in the genre. This disclosure contemplates any type of information related to the object associated with the matching waveform fingerprint.

At Step 508, the social networking system searches its own internal or third-party online databases for location information relating to the detected object. For example, because the social networking system is aware of client device 122's self-determined location, social networking system may enhance the location of client device 122 by matching the detected audio object with entries in online audio databases associated with the general vicinity. For example, absent an explicit on-network statement that a user is in a movie theatre, the social networking system traditionally had no way of determining whether a user was in a movie theatre or near a movie theatre. However, if the social networking system may match the audio waveform fingerprint captured by client device 122 to a particular film, and the particular film and client device 122 location to a listing of showtimes for a theatre near the client device 122's location, the social networking system may be positive that the user is watching a particular movie at a particular theatre.

At Step 509, the server transmits the information to client device 122, and at Step 510, the information is received at client device 122. Client device 122 at Step 511 may then adjust its own device settings, such as reducing the ringer volume or enabling a vibrate mode.

Audio object database 105 is not limited to songs. For example, the social networking system may determine whether a particular user is watching a movie or TV program. In particular embodiments, audio object database 105 stores a fingerprint for each user of the social network's voice. Thus, it is possible to adjust device settings based on the detected voice of a particular user based upon predefined rules. For example, the user of client device 122 may set an explicit rule that sets his or her client device 122 to silent mode in the presence of his or her employer. Thus, if the server matches the detected voice to the voice of the user's employer in audio database 105, the device may automatically enter silent mode.

Figure 6:
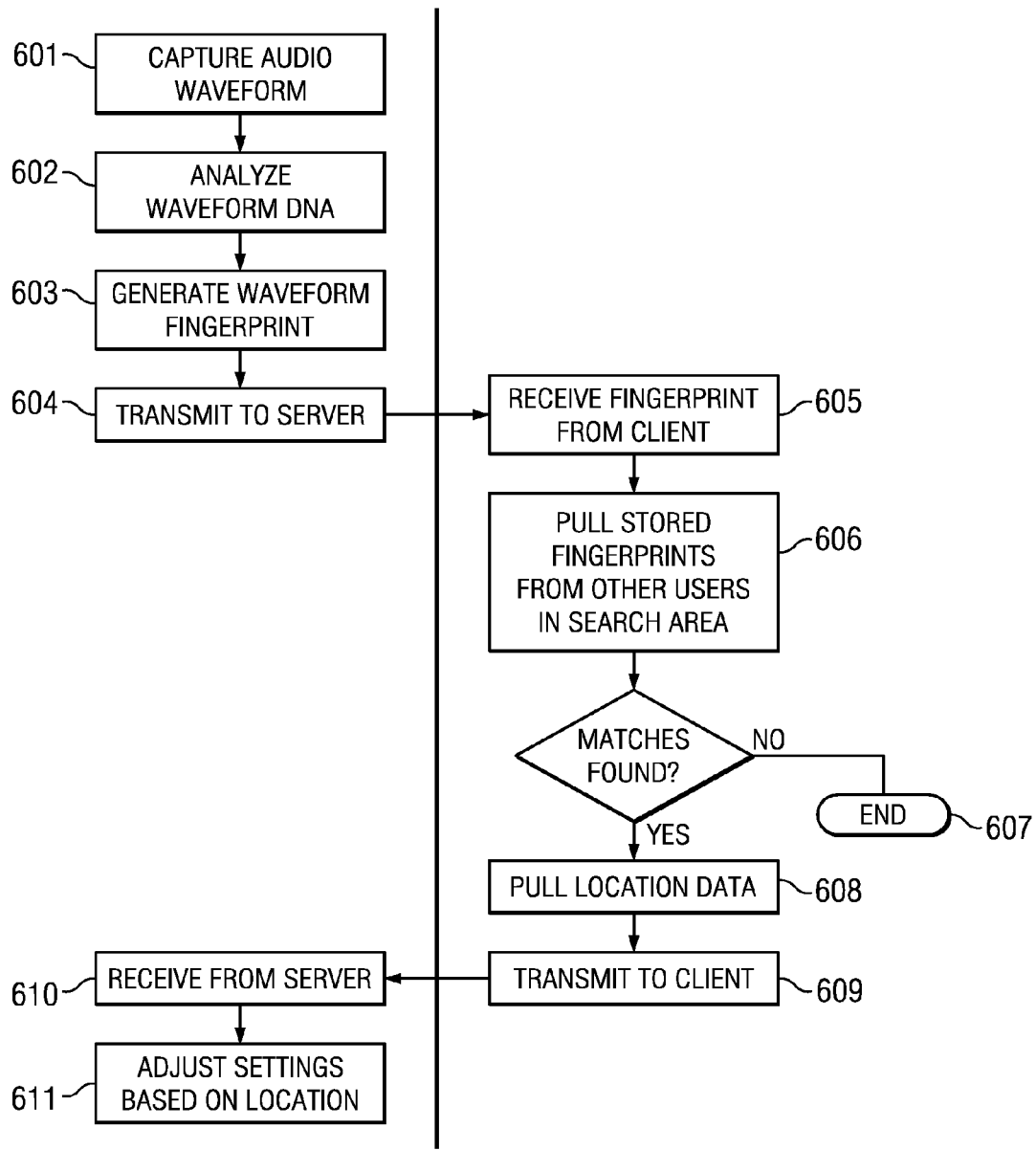
FIG. 6 illustrates an example method of adjusting device settings based on social information.

FIG. 6 illustrates an example method for adjusting device settings based on an enhanced location of a user based on detected waveforms. The process is substantially identical to the process of FIG. 5 until Step 606. In particular embodiments, Steps 606-610 may be performed substantially simultaneously or in parallel with Steps 505-509.

At Step 606, audio matching algorithm 246 pulls uploaded waveforms from the same general time and area as the uploading user. The location may be ascertained through GPS coordinates, TDOA, or a self-reported location, such as a check-in. In particular embodiments, the geographic search area decreases for areas in which a large number of fingerprints are being uploaded. In particular embodiments, the search area is based on the amplitude or absolute volume of the uploaded fingerprint. For example, if an uploaded fingerprint indicates that the ambient sound in the environment of the user is extremely loud, the search area may be decreased, as there would be a larger number of users reporting the same sound from disparate locations. In particular embodiments, the social networking system first searches the fingerprints uploaded by friends of the user at the same time, based on the assumption that they are more likely to be together. In particular embodiments, the individual users uploading the fingerprints are plotted onto a map or grid. In such an embodiments, spatial partitioning algorithms may be used to determine the search space. In particular embodiments, an oct-tree spatial partitioning algorithm is utilized to address the search space. In particular embodiments, a kd-tree is used. in particular embodiments, a quad-tree, or any other grid-based method, is used. This disclosure contemplates any suitable method of generating a search area for fingerprints uploaded by other users.

At Step 608, upon obtaining a matching fingerprint or fingerprints, the social networking system pulls location data associated with the one or more matching fingerprints. For example, if a particular user's uploaded fingerprints match three other users' uploaded fingerprints, and one of the three other users has checked-in to a particular location, then the location data for the check-in is pulled and transmitted to the client devices of the three users that did not check-in. In particular embodiments, the social networking system may average the geographic locations, or find the point equidistant to all the locations, of users uploading matching waveforms. For example, if three other users' uploaded audio fingerprints match the user's uploaded fingerprint, the social networking system may calculate a point equidistant to the three other users' locations. In particular embodiments, the social networking system searches for position outliers, for example if three of the four users with matching uploaded fingerprints are extremely close, and one is several hundred feet away, the social networking system may infer that the location of the outlier user is inaccurate. At Step 609, the location data of Step 608 is transmitted to client device 122, and received by client device 122 at Step 610.

At Step 611, client device 122 adjusts its settings based on the received location data. In particular embodiments, the settings may include adjusting the volume of the ringer, enabling or disabling vibration, adjusting the brightness of the screen, enabling or disabling various wireless connections (such as Bluetooth, Wi-Fi, WiMax, near-field communications, or cellular radio), locking or unlocking the device, enabling an audio recording, or the like. This disclosure contemplates any suitable manner of modifying device settings.

Figure 7:
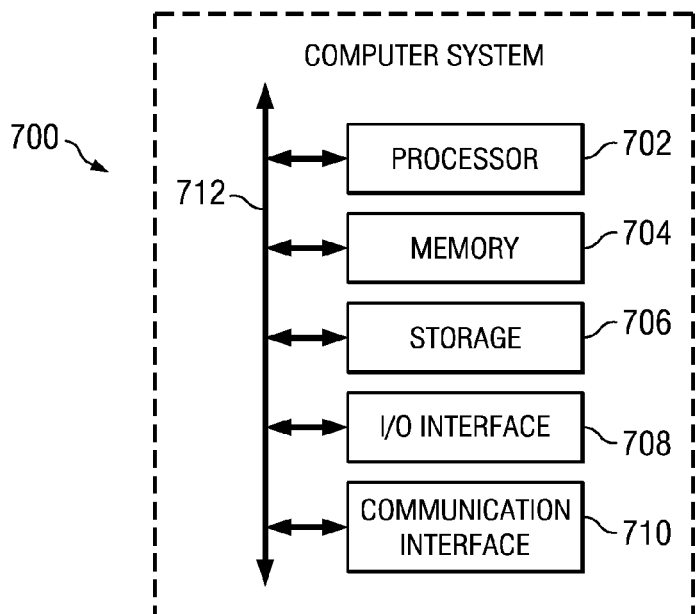
FIG. 7 illustrates an example computer system.

Particular embodiments may be implemented on one or more computer systems. FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 700 may include one or more computer systems 700; be unitary or distributed; span multiple locations; span multiple machines; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate onOne or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include an HDD, a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. Bus 712 may include one or more buses 712, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35

U.S.C. §101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 702 (such as, for example, one or more internal registers or caches), one or more portions of memory 704, one or more portions of storage 706, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA, C, or C++. In particular embodiments, software is expressed in Hyper Text Markup Language (HTML), Extensible Markup Language (XML), or other suitable markup language.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   by a computing system, generating a waveform fingerprint based on captured ambient audio data;
   by the computing system, calculating a self-determined location of the computing system;
   by the computing system, sending the generated waveform fingerprint and the self-determined location to a server;
   by the computing system, receiving instructions from the server to adjust one or more device settings of the computing system, the instructions based at least in part on identifying one or more audio fingerprints that match the generated waveform fingerprint and correlating metadata of one or more of the identified audio fingerprints to refine the self-determined location of the computing system; and
   by the computing system, adjusting one or more of the device settings of the computing system in accordance with the received instructions.

2. The method of claim 1, wherein adjusting the device settings comprises, by the computing system, adjusting a ringer volume of the computing system based on the refined self-determined location.

3. The method of claim 1, wherein adjusting the device settings comprises, by the computing system, enabling a vibrate mode based on the refined self-determined location.

4. The method of claim 1, wherein the metadata comprises information correlating the self-determined location with a particular venue or geographic location.

5. The method of claim 1, wherein adjusting one or more of the device settings occurs while the computing system is at the self-determined location.

6. The method of claim 1, wherein calculating the self-determined location is based on location data of the computing system or an action on a social network.

7. A method comprising:
   by one or more computing systems, receiving a waveform fingerprint and a client-determined location from a client device, wherein the waveform fingerprint was generated based on ambient audio data captured by the client device;
   by one or more computing systems, comparing the received waveform fingerprint to a database of stored waveform fingerprints, each stored waveform fingerprint associated with an object in an object database;
   by one or more computing systems, finding one or more matching fingerprints from the fingerprint database, wherein the matching fingerprints match the received waveform fingerprint; and
   by one or more computing systems, sending one or more instructions to adjust one or more device settings of the client device, the instructions based at least in part on the matching fingerprints fingerprint and correlating metadata of one or more of the identified audio fingerprints to refine the client-determined location.

8. The method of claim 7, further comprising:
   by one or more computing systems, searching one or more external databases associated with one or more geographic locations in the vicinity of the client-determined location;
   by one or more computing systems, upon finding a match for the one or more objects associated with the one or more matching fingerprints, assigning the geographic location associated with the database in which the match was found to the client-determined location; and wherein
   the one or more instructions to adjust one or more device settings is further based on the geographic location.

9. The method of claim 7, wherein the stored waveform fingerprints comprise uploaded waveform fingerprints from one or more other users represented by nodes on a social network, and further comprising:

by one or more computing systems, querying a social graph for location information associated with the one or more other nodes whose uploaded fingerprints match the received reference data, and wherein the one or more instructions to adjust one or more device settings is further based on the location information returned by the social graph in response to the query.

10. The method of claim 7, wherein the location information comprises a check-in to a particular geographic location.

11. The method of claim 7, wherein the location information comprises an RSVP to a particular event.

12. The method of claim 7, wherein the one or more instructions are operable to instruct the client device to increase its ringer volume.

13. The method of claim 7, wherein the one or more instructions are operable to instruct the client device to decrease its ringer volume.

14. The method of claim 7, wherein the one or more instructions are operable to instruct the client device to enable a vibrate mode.

15. A non-transitory, computer-readable media comprising instructions operable, when executed by one or more computing systems, to generate a waveform fingerprint based on captured ambient audio data;

calculate a self-determined location of a client computing system;

send the generated waveform fingerprint and the self-determined location to a server;

receive instructions from the server to adjust one or more device settings of the client computing system, the instructions based at least in part on one or more audio fingerprints that match the generated waveform fingerprint and correlating metadata of one or more of the identified audio fingerprints to refine the self-determined location of the client computing system; and adjust one or more of the device settings of the client computing system in accordance with the received instructions.

16. The media of claim 15, wherein the instructions are further operable to adjust a ringer volume of the client computing system based on the refined self-determined location.

17. The media of claim 15, wherein the instructions are further operable to enable a vibrate mode based on the refined self-determined location.

18. The media of claim 15, wherein the metadata comprises information correlating the self-determined location with a particular venue or geographic location.

19. The media of claim 15, wherein adjusting one or more of the device settings occurs while the client computing device is at the self-determined location.

20. The media of claim 15, wherein calculating the self-determined location is based on location data of the client computing system or an action on a social network.

* * * * *